United States Patent
Dimond, Jr. et al.

(10) Patent No.: US 12,046,031 B2
(45) Date of Patent: Jul. 23, 2024

(54) NEURAL NETWORK AND CLASSIFIER SELECTION SYSTEMS AND METHODS

(71) Applicant: Teledyne FLIR Commercial Systems, Inc., Goleta, CA (US)

(72) Inventors: Brower A. Dimond, Jr., Santa Barbara, CA (US); Pierre M. Boulanger, Goleta, CA (US); Justin Muncaster, Goleta, CA (US); James Klingshirn, Goleta, CA (US); Kedar Babu Madineni, Goleta, CA (US); Louis Tremblay, Goleta, CA (US)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 329 days.

(21) Appl. No.: 17/612,557

(22) PCT Filed: May 18, 2020

(86) PCT No.: PCT/US2020/033495
§ 371 (c)(1),
(2) Date: Nov. 18, 2021

(87) PCT Pub. No.: WO2020/236764
PCT Pub. Date: Nov. 26, 2020

(65) Prior Publication Data
US 2022/0301274 A1    Sep. 22, 2022

Related U.S. Application Data (60) Provisional application No. 62/850,491, filed on May 20, 2019.

(51) Int. Cl.
*G06V 20/00* (2022.01)
*G06N 3/045* (2023.01)
(Continued)

(52) U.S. Cl.
CPC ............ *G06V 20/00* (2022.01); *G06N 3/045* (2023.01); *G06V 10/25* (2022.01); *G06V 20/41* (2022.01)

(58) Field of Classification Search
None
See application file for complete search history.

(56) References Cited

U.S. PATENT DOCUMENTS

2017/0124415 A1 * 5/2017 Choi .................. G06V 10/764
2018/0088996 A1   3/2018 Francesco et al.
(Continued)

FOREIGN PATENT DOCUMENTS

WO   WO-2020236764 A1 * 11/2020 ............ G06F 18/25

OTHER PUBLICATIONS

Object Detection and Tracking based on Recurrent Neural Networks. Zhang et al. (Year: 2018).*
(Continued)

*Primary Examiner* — Delomia L Gilliard
(74) *Attorney, Agent, or Firm* — Haynes and Boone, LLP (57) ABSTRACT

High resolution image target classification systems and methods include a proposal component configured to receive a first set data associated with a scene, the first set of data including at least one image of the scene, a multistage neural network comprising a plurality of neural networks, each neural network trained to receive a region of interest and output an object classification in accordance with an associated resource allocation, and an attention coordinator configured to determine regions of interest in the image and allocate each determined region to one of the plurality of neural networks from the multi-scale neural network, in accordance with available system resources. The system may be configured to optimize a probability of detecting
(Continued)

objects in the image, while minimizing a number of pixels processed through the multi-scale neural network.

20 Claims, 6 Drawing Sheets

(51) Int. Cl.
    *G06V 10/25*     (2022.01)
    *G06V 20/40*     (2022.01)

(56) References Cited

U.S. PATENT DOCUMENTS

2018/0165551 A1*   6/2018   Roh .................... G06V 10/454
2018/0260414 A1*   9/2018   Gordo Soldevila .. G06F 16/532
2019/0057507 A1*   2/2019   El-Khamy ............. G06T 11/60

OTHER PUBLICATIONS

Zhang et al., "Object Detection and Tracking Based on Recurrent Neural Networks", 2018 14th IEEE International Conference on Signal Processing (ICSP), Aug. 12, 2018, pp. 338-343, IEEE, United States of America.

* cited by examiner

NEURAL NETWORK AND CLASSIFIER SELECTION SYSTEMS AND METHODS

CROSS-REFERENCE TO RELATED APPLICATIONS

This patent application is a U.S. National Stage Patent Application under 35 U.S.C. 371 of International Patent Application No. PCT/US2020/033495, filed May 18, 2020 and entitled "NEURAL NETWORK AND CLASSIFIER SELECTION SYSTEMS AND METHODS," which claims priority to and the benefit of U.S. Provisional Patent Application No. 62/850,491 filed May 20, 2019 and entitled "NEURAL NETWORK AND CLASSIFIER SELECTION SYSTEMS AND METHODS," each of which is incorporated herein by reference in its entirety.

TECHNICAL FIELD

One or more embodiments of the present disclosure relate generally to imaging systems, and more particularly, for example, to machine learning systems and methods for image classification systems.

BACKGROUND

In the field of image processing, there is an ongoing need for efficient and reliable ways to detect and classify objects of interest within a field of view (e.g., a scene) of an imaging device. Traditional "smart cameras" combine a machine vision imaging component and a single board computer running rules-based image processing software. These systems are used for simple problems like barcode reading or identifying a particular feature of a known object.

Machine leaning systems have been implemented to provide more complex image analysis. In one approach, various images of an object of interest are collected into a training dataset for training a neural network to classify the object. The training images may be generated with a camera capturing images of the object at various angles and in various setting. A training dataset often includes thousands of images for each object classification, and can be time consuming, expensive and burdensome to produce and update. The trained neural network may be loaded on a server system that receives and classifies images from imaging devices on a network. In some implementations, the trained neural network may be loaded on an imaging system.

Simplified machine vision and image classification systems are available, but such systems are not capable of running robust trained neural networks and are difficult to adapt to various user scenarios. In practical implementations, limitations on memory, processing and other system resources often lead system designers to produce classification systems directed to particular tasks. For example, a neural network is typically trained for particular classifications tasks and implemented to allow for real time operation within the constraints of the system. In view of the foregoing, there is a continued need for improved object detection and classification solutions that are easily adaptable to new use cases and that provide performance or other advantages over conventional systems.

SUMMARY

Various systems and methods are provided for implementing trained neural networks with imaging systems. A novel neural network target classification system lets users take advantage of rapidly accelerating learning technology, frameworks and tools.

High resolution image target classification systems and methods may include a proposal component configured to receive a first set data associated with a scene, the first set of data including at least one image of the scene, a multi-stage neural network comprising a plurality of neural networks, each neural network trained to receive a region of interest and output an object classification in accordance with an associated resource allocation, and an attention coordinator configured to determine regions of interest in the image and allocate each determined region to one of the plurality of neural networks from the multi-scale neural network, in accordance with available system resources. The system may be configured to optimize a probability of detecting objects in the image, while minimizing a number of pixels processed through the multi-scale neural network.

In some embodiments, systems and methods include an end-to-end system for detecting objects using neural network object detection and classification. A video feed representing images of a scene is provided to the system from one or more input devices. External systems, such as a radar system, can also be used to provide information on proposed locations of objects of interest. Optionally, an internal motion detector can be used to provide proposed locations for objects of interest. A stochastic search algorithm may be used with a large area neural network to find proposed objects of interest (e.g., when no other proposed locations are identified). A convolutional neural network attention coordinator may optimize available neural networks to process proposals using multi-scale neural network processing. Targets are identified from the multi-scale neural network processing and/or motion detection algorithms. A short-term target memory is applied to predict new target locations, smooth out temporary detection fallout and track through occlusions. The system may output a video or image with boxes around detected objects of interest.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the disclosure and their advantages are best understood by referring to the detailed description that follows. It should be appreciated that like reference numerals are used to identify like elements illustrated in one or more of the figures.

DETAILED DESCRIPTION

Aspects of the present disclosure generally relate to image classification, and more particularly, for example, to object detection and classification. In various embodiments, an improved imaging system receives video of a scene and/or other data from the scene that correlates to object location. An imaging device, for example, includes an image sensor, a vision processing unit and interfaces for capturing video for further processing by a neural network target classifier. In some embodiments, the captured images include high resolution image and video data. The neural network target classifier receives the data and generates proposals of potential object locations, analyzes the proposals in view of available resources through an attention coordinator, identifies regions of interest for further processing and provides each region of interest to an appropriate neural network for object detection and classification.

Processing high resolution images through neural networks in conventional image classification systems often involves highly complex neural networks that require processing resources that may exceed the resources of the system and/or a reduction in processing accuracy and detail. These constraints are overcome by the systems and methods of the present disclosure, which enable processing of large resolution images or video for objects of interest at a high level of sensitivity. The present disclosure includes methods for processing large image and video files by reducing the received information into a manageable computational area. In some embodiments, an optimized neural network generates proposed areas of interest for classification and also receives proposal requests from external input devices. The method may further select optimal neural work classifiers for processing the proposals and classifying the objects of interest in the proposed area.

In various embodiments, an image classification system is disclosed with improved processing that more efficient and effective in achieving system goals than conventional systems. The image classification system may receive one or more high resolution video streams and efficiently process the high-resolution video streams in real time (or offline in some embodiments) with high level of detail and precision within the constraints of the available system resources. The system is further configured to simultaneously process other data streams associated with a captured scene, such as radar data or audio data, and output an annotated an annotated video identifying and classifying objects that appear (e.g., bounding box on the video image with an associated object classification label).

Figure 1:
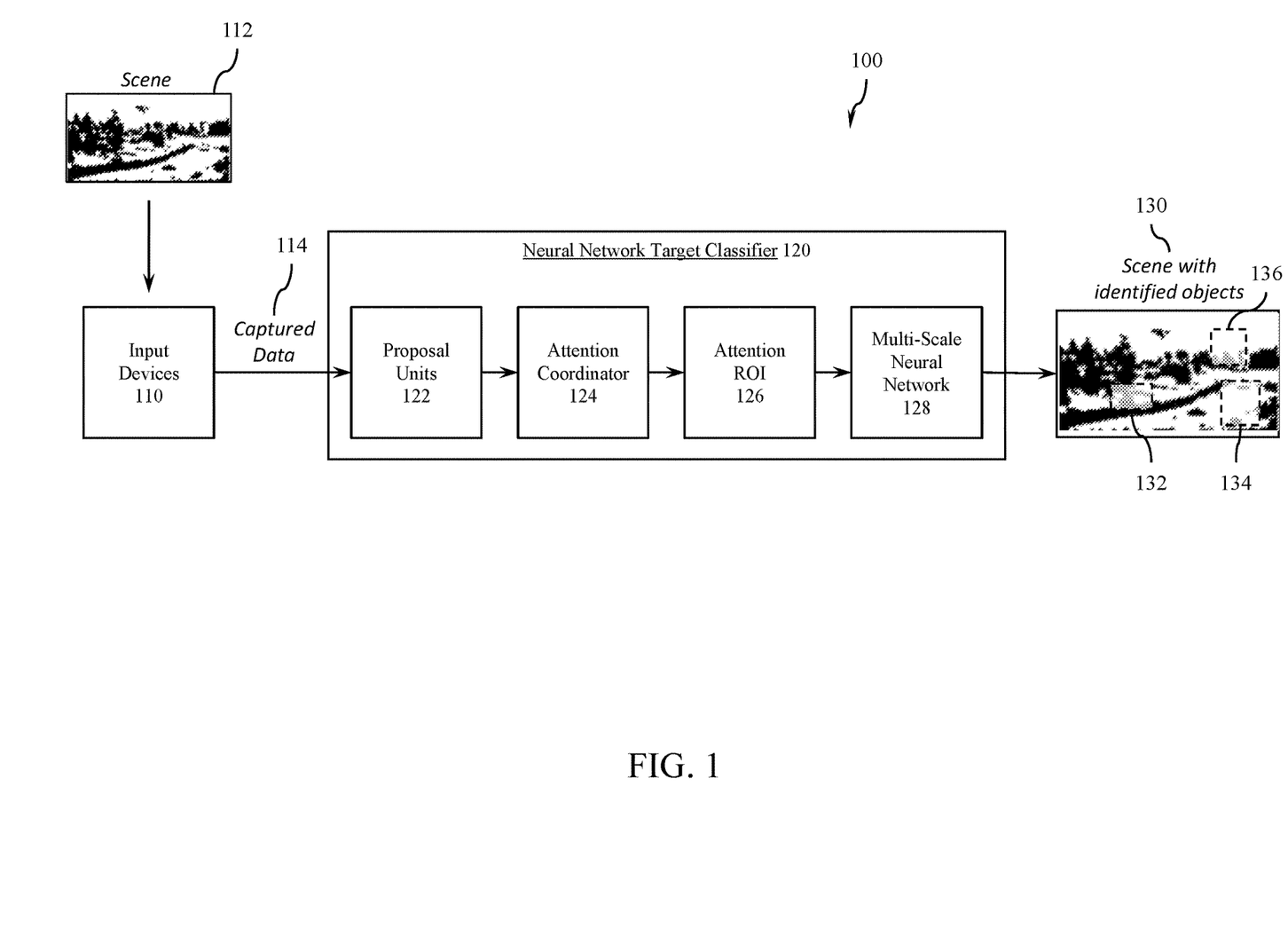
FIG. 1 illustrates an example neural network target classifier, in accordance with one or more embodiments of the present disclosure.

Referring to FIG. 1, an example object detection and classification system 100 will be described in accordance one or more embodiments of the present disclosure. The system 100 includes one or more input devices 110 configured to sense characteristics of a scene 112 and generate corresponding data. The input devices 110 may include a visible spectrum imaging device configured to capture images and/or video of the scene 112, a radar system configured to generate radar data signals representative of physical objects in the scene 112, an infrared imaging system configured to detect infrared radiation from the scene 112, an audio input system configured to sense sounds generated by the scene 112, and/or other input devices.

Data captured by the input device 110 is provided to a neural network target classifier 120 for object detection and classification. In some embodiments, the captured data 114 includes one or more high resolution data streams. The captured data 114 may include, for example, video feeds from one or more cameras in a surveillance system. The captured data 114 may further include data identifying locations of objects of interest, such as data from motion capture and/or object detection components of the input devices 110, data from a radar system
identifying locations of detected objects, and/or other object location data. The proposal unit 122 may also include object detection, motion detection and other components configured to detect the presence and location of objects in the captured data. For example, a stochastic search algorithm may be used with a neural network to find proposed objects of interest in a frame of the captured data 114.

Many systems have memory, processing, bandwidth and real-time constraints that make analyzing every proposed object inefficient and/or impractical. The neural network target classifier system 120 includes an attention coordinator 124 configured to optimize the neural networks to process the proposals generated by the proposal units 122. In some embodiments, the attention coordinator 124 is a neural network that allocates available system resources to maximize the object detection and classification outcomes. The attention coordinator 124 generates attention regions of interest (ROI) 126 that include new target location boundaries and assigns an appropriate neural network from a multi-scale neural network 128 for processing each target location boundary. The multi-scale neural network 128 includes neural networks of varying sizes and complexity, allowing the processing to scale to the input data. The neural network target classifier 120 outputs target object detection and classification results, which may include video and/or image output 130 with boxes around detected objects of interest (e.g., box 132, box 134 and box 136). For example, the output may include a target identifier, a box location and dimensions, a target classification (e.g., drone, person, not_classified), and other information.

The neural network target classifier 120 is configured to process high resolution images for object detection and classification using a neural network that is trained to efficiently process smaller images. The attention coordinator 124 is configured to generate attention RIOs 126 that define a portion of the high-resolution image to process at each time step (e.g., a frame or sequence of frames of data). In some embodiments, the attention coordinator 124 is configured to identify tracking regions associated with known objects, previously detected in prior images. The attention coordinator 124 may further be configured to identify regions for new object discovery. The proposal units 122 analyze available input data from the input devices 110 and generate proposals of regions to analyze for new objects. The proposals may be received from one or more input devices 110 through a local interface (e.g., an image capture device with object detection capabilities) or determined through one or more modules of the proposal units 122. For example, the proposal units 122 may detect motion in a sequence of images and proposed a region to search to identify a new object.

Figure 2:
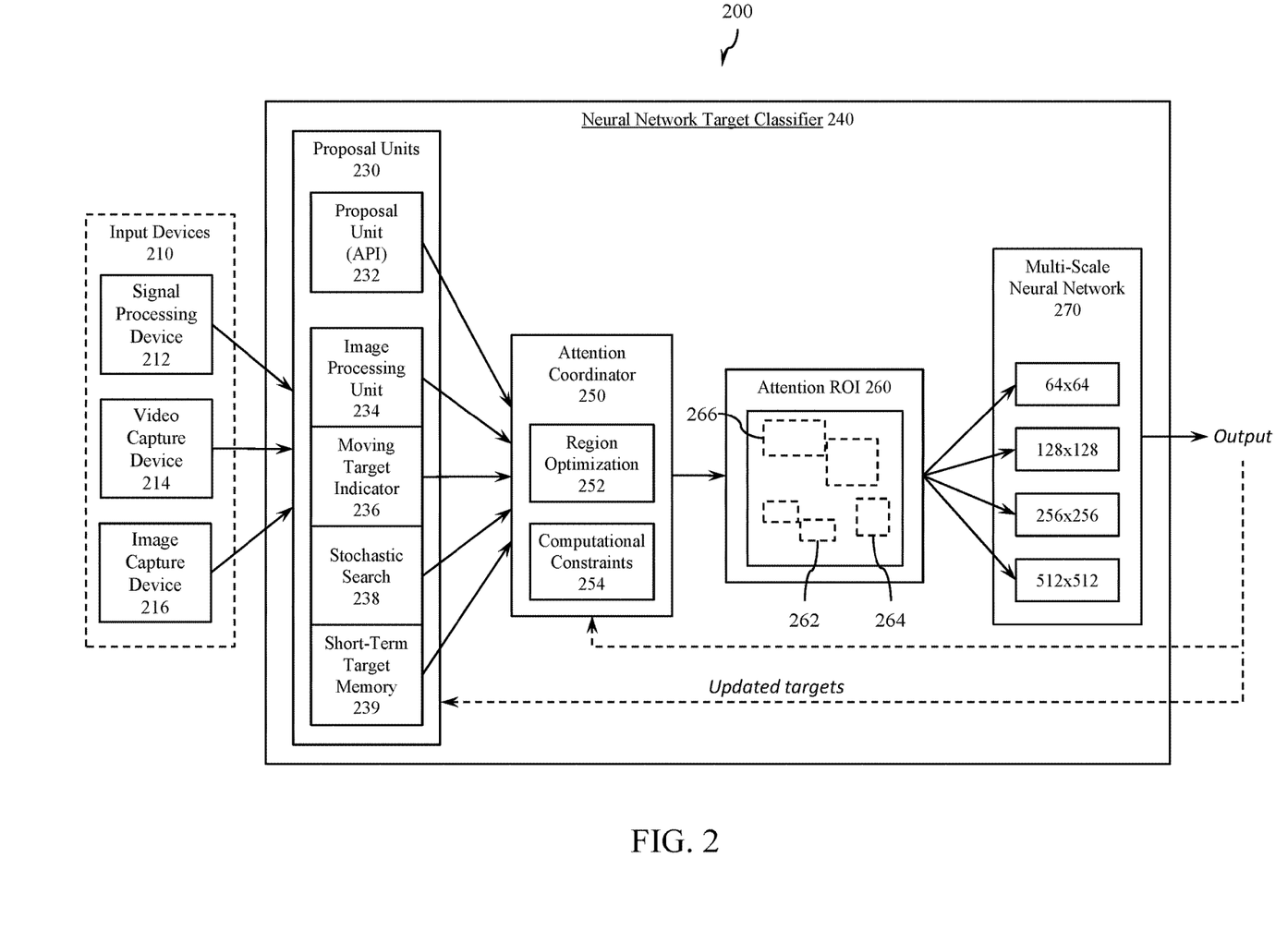
FIG. 2 illustrates an example implementation of a neural network target classifier, in accordance with one more embodiments of the present disclosure.

Additional details of an object detection and classification system will now be described with reference to FIG. 2. An object detection and classification system 200 includes a plurality of input devices 210, which may include a signal processing device 212 (e.g., a radar system), a video capture device 214 (e.g., a video camera in a premises surveillance system or a video camera mounted on a drone for capturing aerial video) and an image capture device 216 (e.g., a visible or infrared camera). Each of the input devices 210 is configured to capture data of a scene and provide corresponding data to a neural network target classifier 240 through a communications network and/or other communications connection. The input devices 210 may further include processing components for identifying and/or tracking objects of interest. For example, a radar system may provide data representing a location of an object or structure within the scene. The video processing device may include motion detection or other object detection components.

Figure 3:
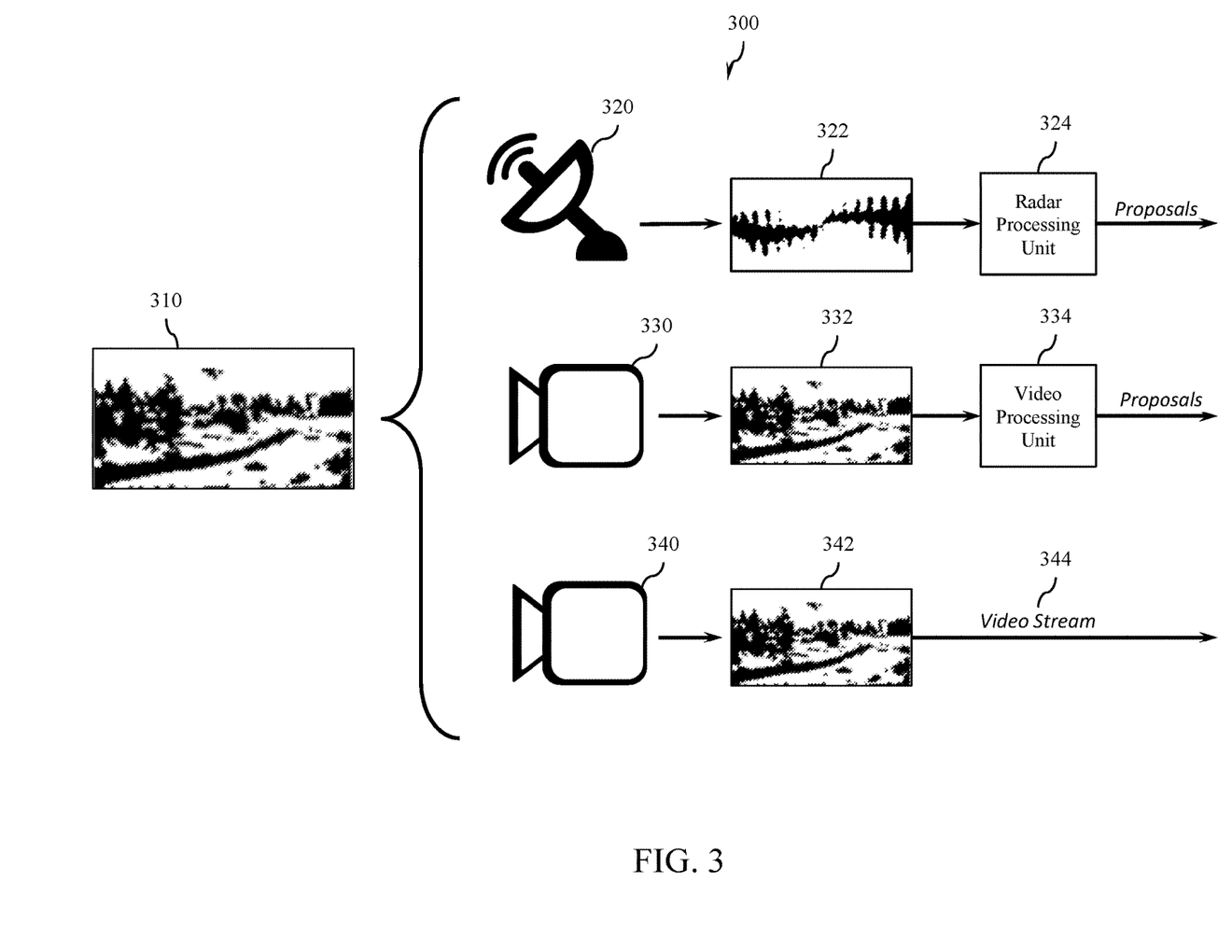
FIG. 3 illustrates an example input devices for used with a neural network target classifier, in accordance with one or more embodiments of the present disclosure.

An example implementation of input devices will now be described in further detail with reference to FIG. 3. The input devices 300 include a plurality of devices configured to capture data related to a scene 310 and provide synchronized data to the proposal units 230 of FIG. 2. The input devices 300 may include any device that capable of sensing characteristics of one or more objects in the scene 310, such as image processing and/or signal processing units. In the illustrated embodiment, the input devices 300 include a radar system 320, a video capture device 330 and a video capture device 340. The radar system 320 is configured to emit a series of pulses or continuous waves into the scene 310 and detect pulses/waves that a reflected back to the radar system 320 off of objects in the scene 310. The radar system 320 produces signal data 322 representing objects in the scene and a radar processing 324 is configured to analyze the signal data 322 to identify the location of objects within the scene 310. The object locations are output to the proposal units 230 (see FIG. 2) for further processing. The video capture device 330 may include an imaging sensor configured to capture a visible or infrared image of the scene 310 and generate a stream of video images 332. The video images 332 are analyzed by video processing unit 334, which provides motion detection and/or object detection of the captured video. Identified objects are provided to the proposal units 230 (see FIG. 2). The input devices 300 may further include a video capture device 340 that includes an imaging sensor configured to capture visible or infrared images 342 of the scene 310 and produce a corresponding video stream 344 which is transmitted to the proposal units 230 (see FIG. 2). The video stream 344 may be analyzed by the proposal units 230 to detect motion and objects.

Referring back to FIG. 2, in various embodiments, the input devices 210 output streams of data to proposal units 230 of a neural network target classifier 240. The proposal units 230 are configured to receive data from input devices 210 and output an identification of proposed target objects of interest (e.g., a region of a captured image that is likely to include a target object of interest. The proposal unit 230 may include components for receiving proposed target object locations from the input devices 210 and/or components for analyzing input data to identify additional proposed target object locations. In the illustrated embodiment, the proposal units include a proposal unit application programmable interface (API) 232 for facilitating communications between the input devices 210 and the neural network target classifier 240 (e.g., to forward externally generated proposals to the attention coordinator 250). The proposal units 230 may further include an image processing unit 234 for analyzing captured image data for targets of interest, a moving target indicator 236 for detecting and/or tracking motion of one or more objects in the input stream (e.g., to generate motion-based proposals), a stochastic search component 238 configured to search a captured image for potential objects and generate random search proposals, and a short-term target memory 239 for tracking regions previously identified in the input data streams that may include objects for detection (e.g., a tracked object that may be out of view, a doorway to a building, a high traffic area, or other region in which an object was previously detected). The short-term target memory 239 may generate prediction proposals for the attention coordinator 250.

The target object proposals are provided to an attention coordinator 250, which is configured to optimize regions of interest for further processing through a region optimization process 252 and a process for tracking/allocating computational constraints 254. The target object proposals may comprise bounding boxes for potential targets, such as a rectangle defined in a portion of the image, defining a region which may contain an object. In one embodiment, the attention coordinator 250 is configured to optimize regions of interest for small target acquisition and high frame-rate target following. The attention coordinator 250 identifies attention regions of interest (ROI) 260, which include a modified set of regions (e.g., box 262, box 264 and box 266) for processing by a multi-scale neural network 270. In some embodiments, the attention coordinator 250 is configured to maximize a probability of object detection (e.g., a probability of detecting all objects in the image), while minimizing total computational processing (e.g., the number of input pixels processed through the multi-scale neural network 270). The attention ROIs may be optimized to cover all proposals, for example, by clustering proposed regions and assigning available multi-scale neural network resources to optimize processing.

The multi-scale neural network 270 includes a plurality of neural networks optimized to process regions of varying sizes. The attention ROI 260 assigns each attention region of interest (e.g., boxes 262, 264 and 266) to one of the neural networks in the multi-scale neural network 270. In the illustrated embodiment, the various neural networks are trained to process image regions of varying sizes, including 64×64, 128×128, 256×256 and 512×512 images sizes, respectively. It will be appreciated that the input image sizes identified in FIG. 2 are merely illustrative and that other neural network configurations and image sizes may be used in accordance with the teachings of the present disclosure. In various embodiments, the multi-scale neural network includes neural networks of varying complexity and the attention ROIs 260 are selected to optimize target object detection and classification results with available computing resources. In some embodiments, the attention coordinator 250 implements a clustering algorithm that attempts to maximize a probability that every target is detected, while minimizing the total number of pixels processed by the multi-scale neural network 270.

In various embodiments, smaller image sizes may be processed more efficiently, with less processing resources, than the larger images and may be assigned to the neural network configured to process images of a similar size. In some embodiments, the attention coordinator 250 assigns small neural networks to process small target regions, and large neural networks to process large target regions. The attention coordinator 250 may further be configured to cluster proposed regions for efficient processing, including clustering one or more small target regions with a large target region to maximize the efficiency of the neural network. The attention ROIs may also comprise a large region that is assigned to a neural network having a smaller input image size. For example, the attention coordinator 250 may determine that a particular image region may be processed with less detail (e.g., a large object may be detected and classified without a detailed analysis). The particular image region may then be resized for input to the allocated neural network.

As previously discussed, various components in the illustrated embodiment may be implemented using a trained neural network. For example, the attention coordinator 250 may be implemented as neural network trained to receive a plurality of region proposals and system resources and produce optimized regions of interests for further processing. The multi-scale neural network 270 may include a plurality of neural network, each trained to detect and/or classify objects within a region of interest.

In various embodiments, the output comprises an annotated video stream that identifies and labels detected objects (e.g., through a labeled bounding box image overlay). In some embodiments, a portion of the output data is fed back to the system for use in processing the next time step. For example, regions defining active objects (e.g., bounding boxes surrounding a detected object) may be provided to the attention coordinator 250 so that the same optimization may be performed at the next timestep and/or the region may be combined with other proposed regions in defining a new attention ROI. The detected object regions may also be provided to the short-term target memory 239 to assist in identifying potential regions for new objects. The regions without detected objects may also be provided to the attention coordinator 250, allowing resources to be directed to other proposed regions.

Figure 4A:
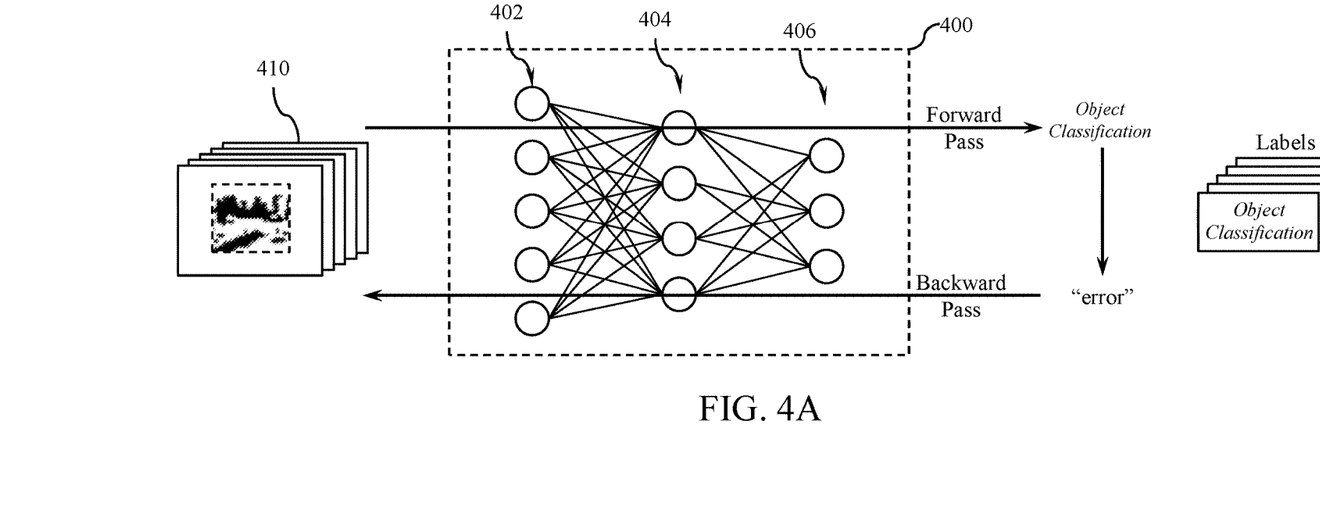
FIG. 4A illustrates an example neural network training process, in accordance with one or more embodiments of the present disclosure.
Figure 4B:
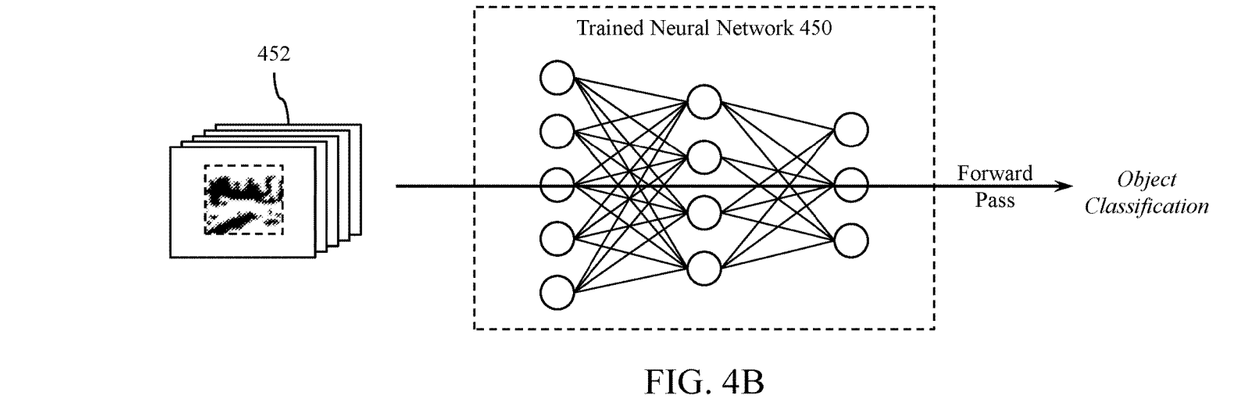
FIG. 4B illustrates an example trained neural network operation, in accordance with one or more embodiments of the present disclosure.

Referring to FIGS. 4A and 4B, an example neural network will now be described. FIG. 4A illustrates a training process for training a neural network 400. The neural network 400 includes at least one input layer 402, at least one hidden layer 404 and at least one output layer 406. The neural network 400 receives a training dataset 410 comprising a series of labeled images representing objects in regions of interest, and outputs an object classification for each image. The training dataset 410 may include images captured from an infrared, visible light, or other type of device that corresponds to input devices and/or data input to the object detection and classification system. In some embodiments, the training dataset 410 includes one or more synthetically generated or modified images. The training dataset 410 may also include other image classification input data (e.g., the output of another trained neural network) that may be available to the system. For example, the training dataset 410 may include attention regions of interest generated by an attention coordinator.

For object classification, the images may comprise a region of interest from a captured image that includes an object to be identified. In one embodiment, the training starts with a forward pass through the neural network 400 which may include feature extraction through a plurality of convolution layers and pooling layers, followed by image classification in a plurality of fully connected hidden layers and an output layer 406. Next, a backward pass through the neural network 400 may be used to update the weighting parameters for nodes of the neural network 400 to adjust for errors produced in the forward pass (e.g., misclassified objects). In various embodiments, other types of neural networks and other training processes may be used in accordance with the present disclosure.

Referring to FIG. 4B, a trained neural network 450 may then be implemented in a runtime environment to classify objects in image regions of interest 452. The runtime environment may include one or more implementations of the systems and methods disclosed herein.

Figure 5:
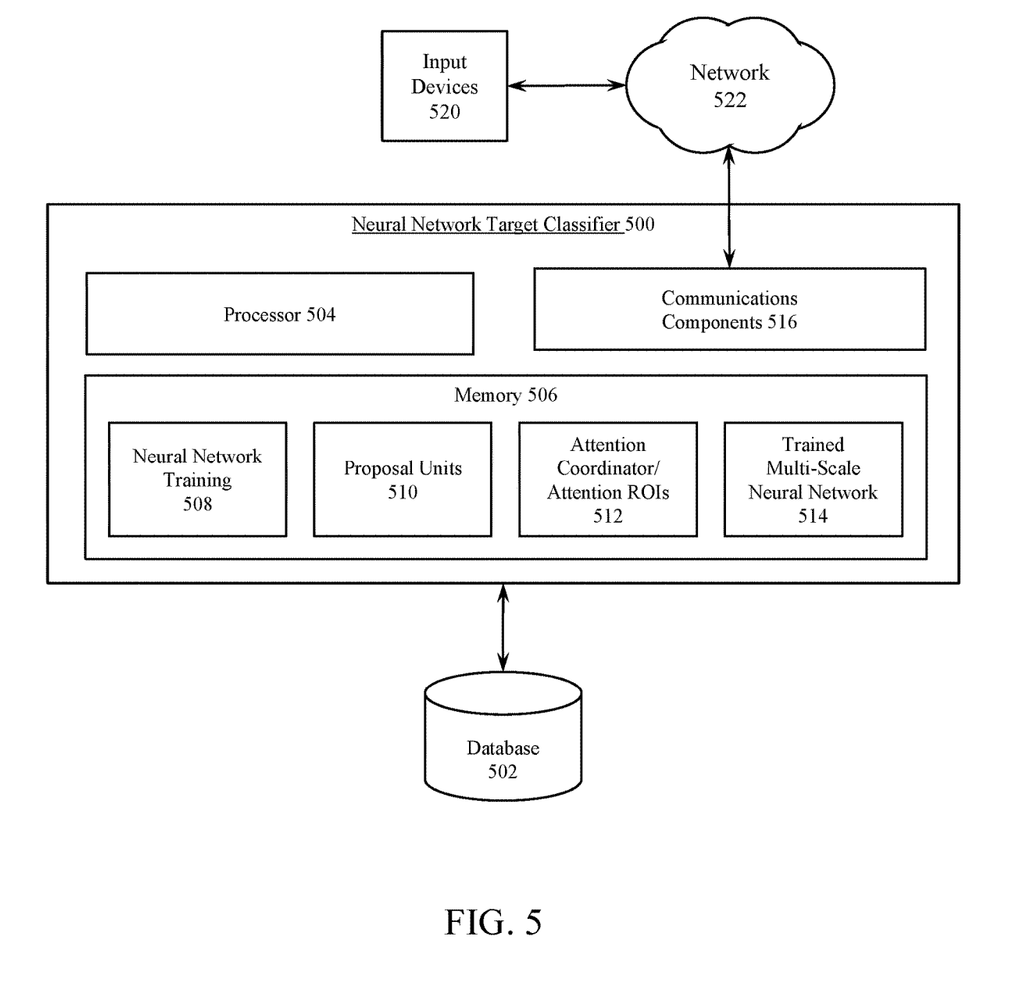
FIG. 5 illustrates an example implementation of a neural network target classifier, in accordance with one or more embodiments of the present disclosure.

An example embodiment of a neural network target classifier 500 will now be described with reference to FIG. 5. The neural network target classifier 500 may be implemented on one or more systems or servers such as an application server that performs data processing and/or other software execution operations for generating, storing, classifying and retrieving images. In some embodiments, the components of the neural network target classifier 500 may be distributed across a communications network, such as communications network 522. The communications network 522 may include one or more local networks such as a wireless local area network (WLAN), wide area networks such as the Internet, and other wired or wireless communications paths suitable for facilitating communications between components as described herein. The neural network target classifier 500 includes communications components 516 configured to facilitate communications with one or more input devices 520 over the communications network 522.

In various embodiments, the neural network target classifier 500 may operate as a general-purpose image classification system, such as a cloud-based image classification system, or may be configured to operate in a dedicated system, such as a video surveillance system that stores video and images captured in real time from a plurality of image capture devices and identifies and classifies objects. The neural network target classifier 500 may be configured to receive one or more images (e.g., an image captured from infrared camera of a video surveillance system or a visible light image) from one or more input devices 520 and other associated data (e.g., radar or audio data from one or more input devices 520) and process associated object identification/classification requests.

In the illustrated embodiment, the neural network target classifier 500 includes one or more processors 504 that perform data processing and/or other software execution operations and a database 502 that stores data used by the system. The processor 504 may include logic devices, microcontrollers, processors, application specific integrated circuits (ASICs), field programmable gate arrays (FPGAs) or other devices that may be used by the neural network target classifier 500 to execute appropriate instructions, such as software instructions stored in memory 506, including neural network training component 508, proposal units components 510, attention coordinator and attention ROI components 512, trained multi-scale neural network components 514, and/or other applications. The memory 506 may be implemented in one or more memory devices (e.g., memory components) that store executable instructions, data and information, including image data, video data, audio data, network information. In various embodiments, the neural network target classifier 500 may be configured to interface with various network devices, such as a desktop computer or network server, a mobile computing device such as a mobile phone, tablet, laptop computer or other computing device having communications circuitry (e.g., wireless communications circuitry or wired communications circuitry) for connecting with other devices in the neural network target classifier 500.

The communications components 516 may include circuitry for communicating with other devices using various communications protocols. In various embodiments, communications components 516 may be configured to communicate over a wired communication link (e.g., through a network router, switch, hub, or other network devices) for wired communication purposes. For example, a wired link may be implemented with a power-line cable, a coaxial cable, a fiber-optic cable, or other appropriate cables or wires that support corresponding wired network technologies. Communications components 516 may be further configured to interface with a wired network and/or device via a wired communication component such as an Ethernet interface, a power-line modem, and/or other appropriate components for wired communication. Proprietary wired communication protocols and interfaces may also be supported by communications components 516.

Figure 6:
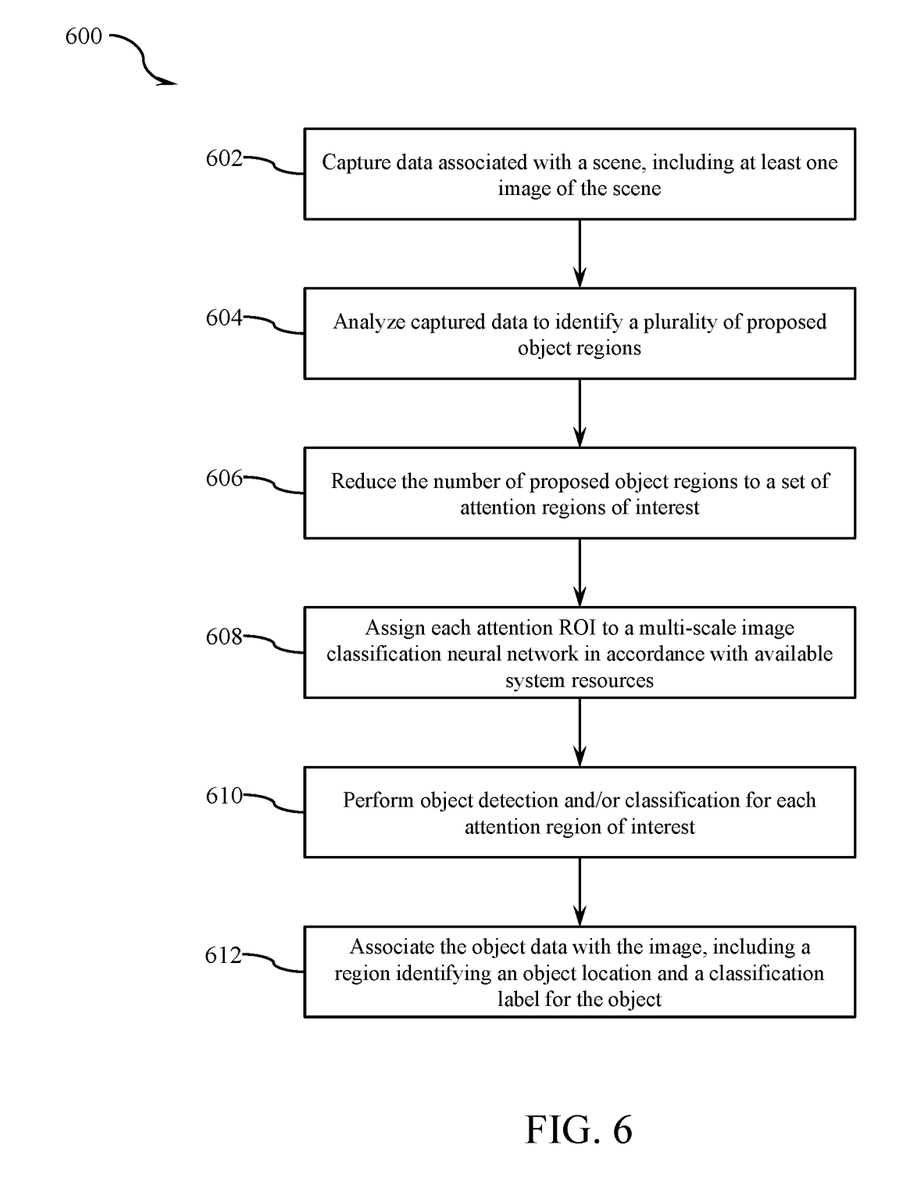
FIG. 6 illustrates an example operation of a neural network target classifier, in accordance with one or more embodiments of the present disclosure.

An example operation of an object detection and classification system using a neural network target classifier of the present disclosure will now be described with reference to FIG. 6. The process 600 may be implemented on a networked neural network target classification system that includes one or more application servers (e.g., the implementation illustrated in FIG. 5), in a dedicated system that includes one or more image capture devices (e.g., a premises video surveillance system), or other image processing system. In step 602, the input devices capture data associated with a scene, including at least one image of the scene. The data may also include non-image data, such as radar data, audio data, and other sensed data.

In step 604, the captured data is analyzed to identify potential object regions, based on image analysis, motion detection, radar signals, audio signals and/or other data analysis. In step 606, these proposed object regions are then analyzed along with system resource information (memory, bandwidth, processing capabilities) to derive attention regions of interest for further processing. The attention regions of interest may include regions comprising two or more proposed object regions. For example, an attention region of interest, may reduce the number search regions by defining a single region that covers multiple proposed regions. The attention regions of interest may also exclude proposed regions where there is a low likelihood detecting an object of interest.

In step 608, each attention region interest is assigned to a multi-scale image classification neural network in accordance with available system resources. In one embodiment, a multi-scale neural network includes a plurality of image classification neural networks, each having a different level of computational complexity. By assigning the attention regions of interest in this manner, the system may allocate resources to accomplish object detection and classification goals. In some embodiments, the attention regions of interest have a region size and a probability of detecting an object of interest, and resources are allocated to maximize the chances of detecting and classifying objects, efficiently use available resources and/or accomplish other system goals. In step 610, the neural networks of the multi-scale neural network process each attention region of interest to detect and/or classify objects. In step 612, the system associates the object data with the captured image (or video) of the scene, including defining a region identifying a detected object location and a classification label for the detected object.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
a proposal component configured to receive a first dataset associated with a scene, the first dataset including at least one image of the scene;
a multi-scale neural network comprising a plurality of neural networks, each neural network trained to receive a region of interest and output an object classification, wherein operation of each of the plurality of neural networks has an associated system resource allocation comprising memory resources and/or processing resources; and
an attention coordinator configured to determine regions of interest in the image for processing by the multi-scale neural network and allocate each determined region of interest to one of the plurality of neural networks from the multi-scale neural network for object classification, based at least in part on available system resources and the associated system resource allocation for each of the plurality of neural networks.

2. The system of claim 1, further comprising:
a plurality of input devices comprising a visible spectrum image capture device configured to capture the image of the scene, and a second input device configured to generate a second set of data associated with the scene.

3. The system of claim 2, wherein the second input device comprises a radar system, an audio capture system, and/or an infrared imaging system.

4. The system of claim 1, wherein the first dataset further includes an identification of at least one object region.

5. The system of claim 1, wherein the proposal component is further configured to analyze the first dataset and identify a plurality of proposed regions of interest in the at least one image of the scene.

6. The system of claim 5, wherein the proposal component comprises a moving target component configured to identify one or more regions in the at least one image associated with detected motion.

7. The system of claim 5, wherein the proposal component comprises a stochastic search component configured to search the at least one image and identify one or more regions associated with an object.

8. The system of claim 1, wherein each of the plurality of neural networks is configured to process a region of interest having an input image size, and wherein the input image size is different for each of the plurality of neural networks.

9. The system of claim 1, wherein the attention coordinator is further configured to determine regions of interest in the image and allocate each determined region to one of the plurality of neural networks from the multi-scale neural network, based at least in part on an optimization of a probability of detecting each object of interest in the image and/or a minimization of a number of pixels processed by the multi-scale neural network.

10. The system of claim 1, wherein the proposal component further comprises a short-term target memory configured to track regions associated objects classified by the multi-scale neural network and generate a prediction proposal for use by the attention coordinator to determine regions of interest in the image.

11. A method comprising:
receiving a first set of data associated with a scene, the first set of data including at least one image of the scene;
providing a multi-scale neural network comprising a plurality of neural networks, each neural network trained to receive a region of interest and output an object classification, wherein each of the plurality of neural networks has an associated system resource allocation, comprising memory resources and/or processing resources;
determining regions of interest in the image for processing by the multi-scale neural network; and
allocating each determined region of interest to one of the plurality of neural networks from the multi-scale neural network for object classification, based at least in part on, available system resources and the associated resource allocations for each of the plurality of neural networks.

12. The method of claim 11, further comprising:
capturing the image of the scene; and
generating a second set of data associated with the scene.

13. The method of claim 12, wherein the second set of data comprises radar data, audio data, and/or infrared imaging data associated with the scene.

14. The method of claim 11, wherein the first set of data further includes an identification of at least one object region.

15. The method of claim 11, further comprising analyzing the first set of data and identifying a plurality of proposed regions of interest in the at least one image of the scene.

16. The method of claim 15, further comprising identifying one or more regions in the at least one image associated with detected motion.

17. The method of claim 15, further comprising searching, using a stochastic search process, the at least one image and identify one or more regions associated with an object.

18. The method of claim 11, wherein each of the plurality of neural networks is configured to process a region of interest having an input image size, and wherein the input image size is different for each of the plurality of neural networks.

19. The method of claim 11, wherein determining regions of interest in the image and allocating each determined region to one of the plurality of neural networks from the multi-scale neural network, is based at least in part on an optimization of a probability of detecting each object of interest in the image, and/or a minimization of a number of pixels processed by the multi-scale neural network.

20. The method of claim 11, wherein determining regions of interest further comprises tracking, using a short-term target memory, a region associated with an object classified by the multi-scale neural network and generating a prediction proposal for a location of the tracked region in the image of the scene.

* * * * *